US006952332B2

(12) United States Patent
Slade et al.

(10) Patent No.: US 6,952,332 B2
(45) **Date of Patent: *Oct. 4, 2005**

(54) VACUUM ARC ELIMINATOR HAVING A BULLET ASSEMBLY ACTUATED BY A GAS GENERATING DEVICE

(75) Inventors: Paul G. Slade, Ithaca, NY (US); Erik Dannel Taylor, Ithaca, NY (US); Mary Jo Johnson Vander Heiden, Hubertus, WI (US)

(73) Assignee: Eaton Corporation, Cleveland, OH (US)

( * ) Notice: Subject to any disclaimer, the term of this patent is extended or adjusted under 35 U.S.C. 154(b) by 308 days.

This patent is subject to a terminal disclaimer.

(21) Appl. No.: 10/172,281

(22) Filed: Jun. 14, 2002

(65) Prior Publication Data

US 2003/0231438 A1 Dec. 18, 2003

(51) Int. Cl.[7] .................................................. H02H 9/00
(52) U.S. Cl. ................................ 361/56; 361/2; 218/57
(58) Field of Search ............................... 361/2, 56, 111, 361/42, 43, 115; 200/61, 300; 218/57, 67, 158, 154

(56) References Cited

U.S. PATENT DOCUMENTS

| | | | | |
|---|---|---|---|---|
| 4,150,266 A | * | 4/1979 | Patrichi | 200/61.08 |
| 4,417,519 A | * | 11/1983 | Lutz | 102/263 |
| 5,510,946 A | | 4/1996 | Franklin | |
| 5,903,427 A | | 5/1999 | Roby | |
| 5,933,308 A | | 8/1999 | Garzon | |
| 5,940,547 A | | 8/1999 | Schumacher et al. | |
| 6,140,715 A | | 10/2000 | Bernhoff et al. | |
| 6,141,192 A | | 10/2000 | Garzon | |
| 6,229,680 B1 | | 5/2001 | Shea | |
| 6,239,514 B1 | | 5/2001 | Isberg et al. | |

OTHER PUBLICATIONS

Klockner–Moeller Ltd., "ARCON, Arc Fault Detection and Quenching System", 6 pgs.
Utu, "UTU Arc Protection Systems—a possibility to be protected", 4 pgs., Ulvila, Finland.
Garzon, R., "Arc Terminator An Alternative to Arc–Proofing", pp. 1–5, Square "D" Company, Smyrna, TN.
Square D Schneider Electric, "Arc–Terminator—Medium voltage arc–detection and arc–termination device", Power 2000, 9 pgs.
ABB Power Distribution, "ArcEliminator Rapid Elimination of Internal Arcing", 4 pgs., Arboga, Sweden.
Siemens, "Pressure Switch System 8AX10 For Medium Voltage Switchgear", 1 pg.
Berger, F. et al., "KurzschlieBer mit Gasgeneratorantrieb fur Storlichtbogenschutz", 4 pgs., Mar. 1999, Federal Republic of Germany.
Risi, "EBW Cable Cutter", 1 pg., San Ramon, CA.
Risi, "Technical Discussion on Explosives", 13 pgs.

* cited by examiner

*Primary Examiner*—Brian Sircus
*Assistant Examiner*—Boris Benenson
(74) *Attorney, Agent, or Firm*—Martin J. Moran

(57) ABSTRACT

A vacuum arc interrupter that includes a vacuum chamber assembly and a pressure chamber assembly. The vacuum chamber assembly includes a vacuum chamber and a first conductor which is structured to be coupled to a circuit. The first conductor is disposed within the vacuum chamber. The pressure chamber assembly has a second conductor structured to be coupled to a ground, a pressure chamber, a gas generation device and a bullet assembly. The pressure chamber assembly disposed adjacent to the vacuum chamber assembly. The gas generation device coupled to, and in fluid communication with the pressure chamber. The bullet assembly is disposed in the pressure chamber and structured to move between a first position, where the bullet assembly is spaced from the first and second conductors, and a second position, where the bullet assembly contacts, and is in electrical communication with, the first and second conductors.

23 Claims, 5 Drawing Sheets

VACUUM ARC ELIMINATOR HAVING A BULLET ASSEMBLY ACTUATED BY A GAS GENERATING DEVICE

CROSS-REFERENCE TO RELATED APPLICATIONS

This application is related to commonly assigned, concurrently filed:

U.S. patent application Ser. No. 10/172,208 filed Jun. 14, 2002, entitled "Shorting Switch And System To Eliminate Arcing Faults In Power Distribution Equipment", now U.S. Pat. No. 6,724,604;

U.S. patent application Ser. No. 10/172,651, filed Jun. 14, 2002, entitled "Shorting Switch And System To Eliminate Arcing Faults In Power Distribution Equipment", now U.S. Pat. No. 6,657,150;

U.S. patent application Ser. No. 10/171,826, filed Jun. 14, 2002, entitled "Shorting Switch And System To Eliminate Arcing Faults In Low Voltage Power Distribution Equipment", now U.S. Pat. No. 6,633,009;

U.S. patent application Ser. No. 10/172,238, filed Jun. 14, 2002, entitled "Shorting Switch And System To Eliminate Arcing Faults In Power Distribution Equipment";

U.S. patent application Ser. No. 10/172,622, filed Jun. 14, 2002, entitled "Bullet Assembly For A Vacuum Arc Interrupter";

U.S. patent application Ser. No. 10/172,080, filed June 14, 2002, entitled "Vacuum Arc Interrupter Having A Tapered Conducting Bullet Assembly";

U.S. patent application Ser. No 10/172,209, filed June 14, 2002, entitled "Vacuum Arc Interrupter Actuated By A Gas Generated Driving Force"; and U.S. patent application Ser. No. 10/172,628, filed June 14, 2002, entitled "Blade Tip For Puncturing Cupro-Nickel Seal Cup".

BACKGROUND OF THE INVENTION

1. Field of the Invention

This invention relates to a vacuum arc interrupter and, more specifically, to a vacuum arc interrupter that utilizes a bullet assembly that is actuated by a gas generating source.

2. Background Information

There is the potential for an arcing fault to occur across the power bus of a motor control center (MCC), another low voltage (LV) enclosure (e.g., an LV circuit breaker panel), other industrial enclosures containing LV power distribution components, as well as medium voltage (MV) enclosures. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

It is known to employ a spring device and piston to rapidly couple a live conductor to a grounded conductor in a vacuum arc interrupter in order to short the circuit upstream of the LV components. A vacuum arc interrupter utilizes two contacts in a vacuum chamber. One contact is fixed and the other contact is movable. The movable contact includes a stem, which is coupled to a bellows, that extends outside of the vacuum chamber. The spring is coupled to the stem and to a release device. The release device is coupled to an arc sensor in the LV or MV enclosure. The stem, and therefore the movable contact, moves from a first position at one end of the chamber to a second position at the opposite end of the chamber. One contact is coupled to the LV or MV circuit and the other contact is grounded. In operation the first position of the piston corresponds to the open position of the contacts. When an arc occurs in the LV or MV equipment, the arc sensor actuates the spring release device, thereby allowing the contacts to move into the second position and short the circuit.

Another device, that is, a device which is not a vacuum arc interrupter, for shorting a circuit included a tapered slug which is propelled by high pressure gas into a tapered set of openings extending through two bus bars and a layer of insulation. The slug is maintained in a pressure chamber coupled to a gas-generating device. When gas is rapidly introduced to the pressure chamber, the slug is propelled into the tapered opening, contacting both bus bars. Typically, one bus is coupled to a live circuit and the other bus is grounded. Thus, when the slug contacts both buses, the circuit is shorted.

These interrupters suffer from several disadvantages. For example, the prior art vacuum arc interrupters require multiple components to be maintained in the vacuum chamber. Certain components, such as the bellows, are difficult and expensive to construct. Construction of the vacuum arc interrupter could be simplified if more components could be maintained outside of the vacuum chamber. Prior art vacuum arc interrupters utilizing springs, because of their nature, do not have a means for stopping the upward motion of the movable contact. That is, the spring mechanism is structured to absorb the reactive forces caused by the contacts colliding. Certain prior art vacuum arc eliminators also include a combination of springs and shock absorbers. The use of a spring or a combination of a spring and a shock absorber reduces, but does not eliminate, the bounce which occurs when the moving component contacts the stationary component. Thus, the prior art vacuum arc interrupters do not have a mechanism for stopping the advance of the moving component.

Furthermore, with regard to the prior art utilizing a slug, the slug relied on the application of gas pressure on the piston to ensure that the piston remained in the second position. Or, if the slug moved in a downward direction and the slug was heavy, gravity provided a sufficient force to hold the slug in place. That is, this system did not include a mechanical lock to maintain the slug in the second position. Additionally, the prior art slugs have a generally flat pressure surface. Because the gas is typically introduced through a small opening, the pressure distribution on the slug pressure surface is uneven. The uneven pressure distribution prevents the slug from moving as fast as a slug where the pressure distribution is even. Another disadvantage of this device is that, where the slug is received in a conductor having a small cross-sectional area, the electromagnetic field created by the contact may by very strong.

There is, therefor, a need for a vacuum arc interrupter that closes a circuit as rapidly as a device utilizing a slug.

There is a further need for vacuum arc interrupter that utilizes a gas generation device.

There is a further need for a vacuum arc interrupter that utilizes a first conductor maintained within a vacuum chamber and a second conductor disposed outside of the vacuum chamber.

There is a further need for a vacuum arc interrupter that utilizes a bullet assembly to electrically link two conductors where a first conductor is maintained within a vacuum chamber and the second conductor is disposed outside of the vacuum chamber.

SUMMARY OF THE INVENTION

These needs, and others, are satisfied by the disclosed invention which provides a vacuum arc interrupter having a vacuum chamber assembly and an adjacent pressure chamber assembly. A first conductor is within a vacuum chamber in the vacuum chamber assembly, and a second conductor, which is part of the pressure chamber assembly, is disposed outside of the vacuum chamber. The two conductors are electrically coupled by a bullet assembly. The bullet assembly includes a conductive lance. The bullet assembly is slidably disposed within a pressure chamber in the pressure chamber assembly. The bullet assembly is originally in a first position where the entire bullet assembly is disposed is within the pressure chamber. When the pressure in the pressure chamber is rapidly increased by a gas generation device, the bullet assembly moves to a second position where the lance contacts the second conductor and extends beyond the pressure chamber assembly to contact the first conductor. To access the first conductor, the lance punctures a seal that is integral to the vacuum chamber assembly.

The pressure chamber includes a first sized portion and a second sized portion. Both the first sized portion and the second sized portion have a generally constant cross-sectional area, with the first sized portion having a smaller cross-sectional area than the second sized portion. Between the first sized portion and the second sized portion is a transition portion. The transition portion has a cross-sectional area that tapers from the cross-sectional area of the first sized portion to the cross-sectional area of the second sized portion. The first sized portion is in fluid communication with an inlet port opening. The inlet port opening is coupled to, and in fluid communication with, the gas generating device. The second sized portion is in fluid communication with a bullet assembly opening.

The bullet assembly includes a piston assembly and the lance. The bullet assembly piston assembly has a first side and a second side. Hereinafter, the first side will be the side exposed to the gas generating source and therefore may also be referred to as the pressure surface. The piston assembly pressure surface is not flat. As such, gas from the gas generating source is dispersed across the surface of the pressure surface thereby reducing areas of localized pressure. The pressure surface may be either concave or convex. Preferably, the pressure surface is convex, and, where the piston is circular, conical. The conical surface, preferably, has a more obtuse angle than the angle of the taper of the pressure chamber transition portion. As such, there is a gap between the pressure surface and the sidewall of the transition portion. In use, when the gas generation source is activated, the gas entering the chamber first sized portion and the chamber transition portion contacts the conical surface and is dispersed in the gap. The dispersal of the gas creates an even pressure distribution on the pressure surface and causes the piston to move from a first position adjacent to the transition portion to a second position away from the transition portion.

The bullet assembly lance is made from a conductive material and includes an elongated body having a tapered tip and a flared base. The tapered tip is structured to engage a cup on a first conductor, where the cup has a cavity corresponding to the shape of the lance tip. Alternatively, the cup may have a cavity that partially corresponds to the shape of the lance tip, thereby having an interference fit. The flared base is structured to correspond to the shape of a tapered passage in a conductor. The lance is sized so that as the flared base engages the tapered opening in one conductor, the tip firmly engages the cup disposed on the other conductor. Thus, the lance acts to electrically couple the two conductors.

In operation, the vacuum arc interrupter has one conductor, typically the first conductor, coupled to, and in electrical communication with, a circuit. The second conductor is coupled to, and in electrical communication with, a ground. The circuit includes a low voltage or medium voltage device at a point downstream of the vacuum arc interrupter. The low voltage or medium voltage device includes an arc detector which is coupled to and structured to activate the gas generating device. When an arc is detected in the low voltage or medium voltage device, the gas generating device generates a gas which flows into the pressure chamber first sized portion and the transition portion gap. The gas generating device delivers gas at a pressure about 180 psi, through the inlet port into the chamber first size portion. This increase of pressure occurs in about 0.5 msec and causes the bullet assembly to move from the first position to the second position in less than 2.0 msec. Because the inlet port opening is on the piston first side, gas from the gas generating device will flow into the chamber first sized portion and transition portion and contact the angled piston first side. The angle of the piston first side assists the gas in dispersing through the chamber transition portion and thus creates an even pressure distribution on the piston first side. As the bullet assembly moves from the first position to the second position, the lance passes through a tapered passage in the second conductor causing the lance to puncture the seal on the vacuum chamber. The flared base is sized to correspond to the tapered opening. Thus, when the flared base contact the tapered passage, the motion of the bullet assembly is stopped. At this the same time the flared base contacts the tapered passage, the lance tip contacts the first conductor, thereby electrically coupling the two conductors.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
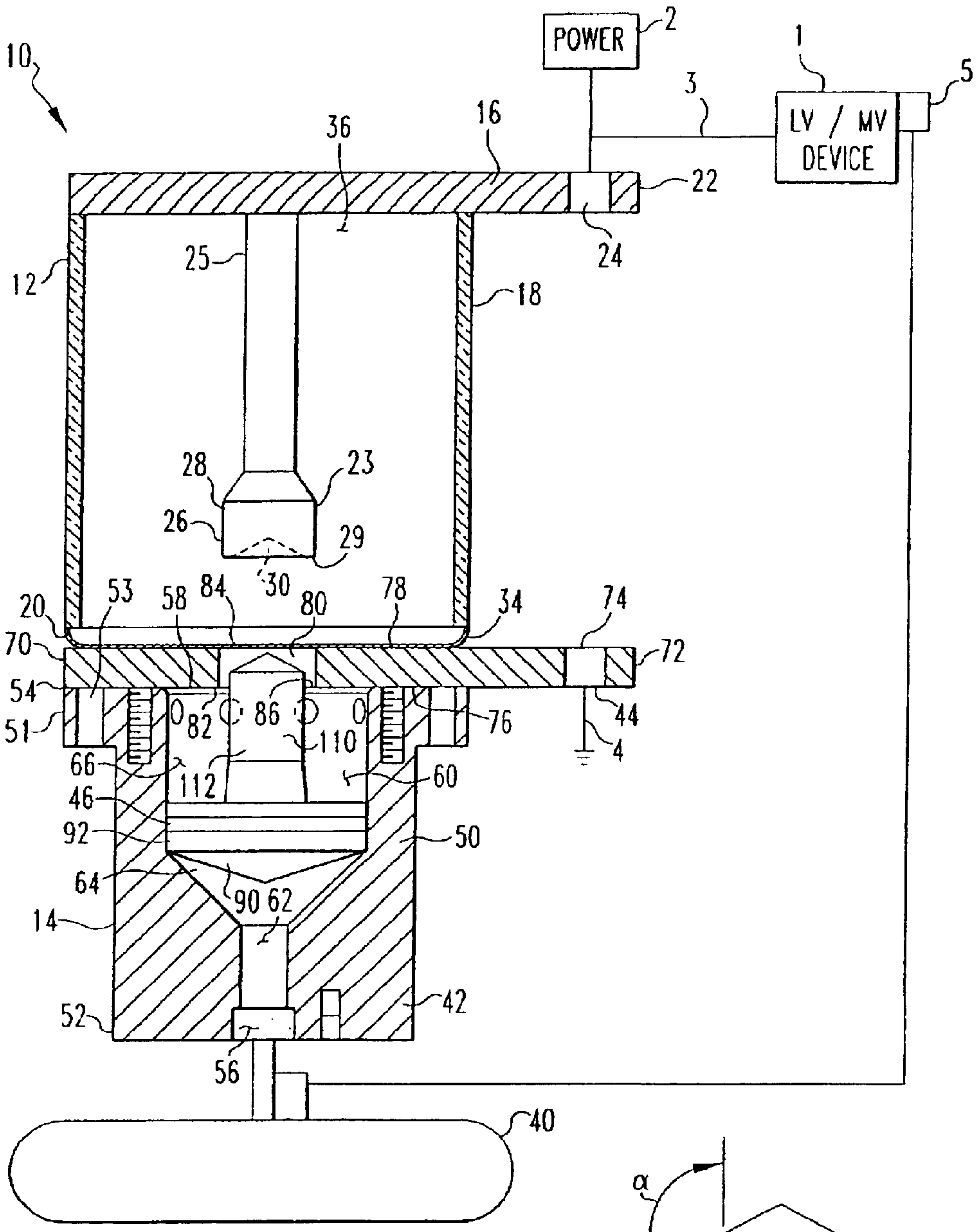
FIG. 1 is a cross-sectional view of the present invention with the piston in the first position.
Figure 1A:
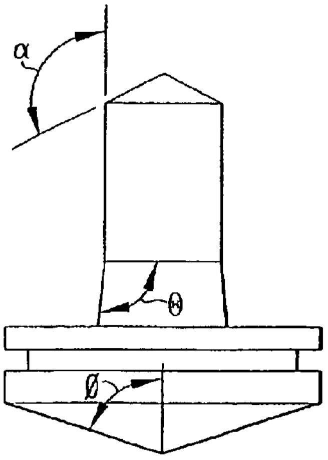
Figure 2:
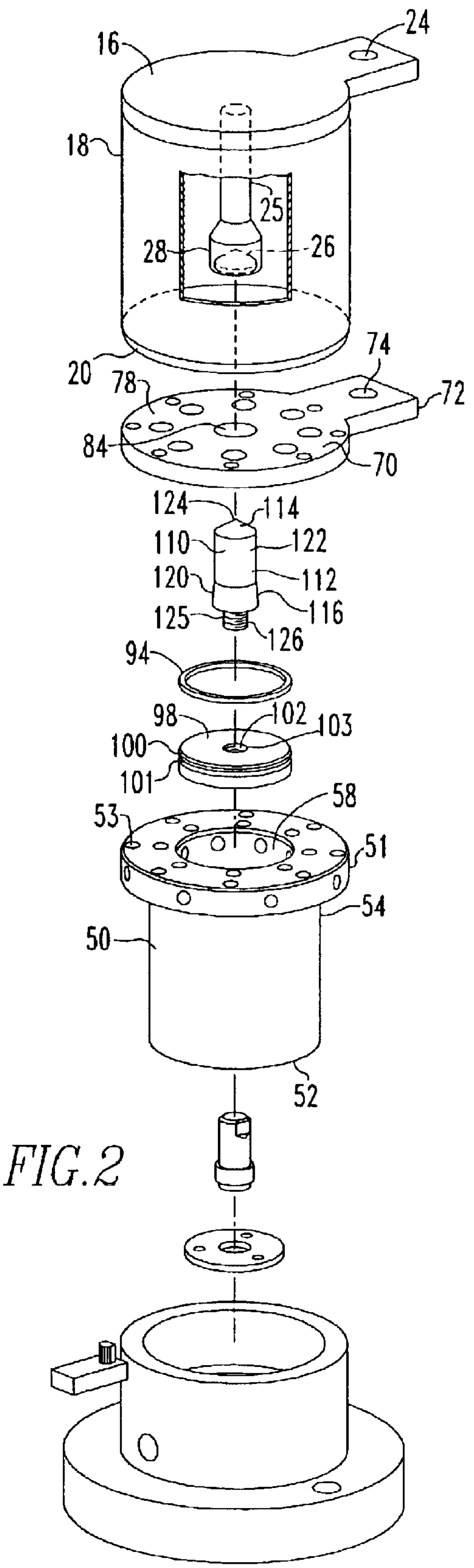
FIG. 2 is an exploded isometric view of the present invention.
Figure 3:
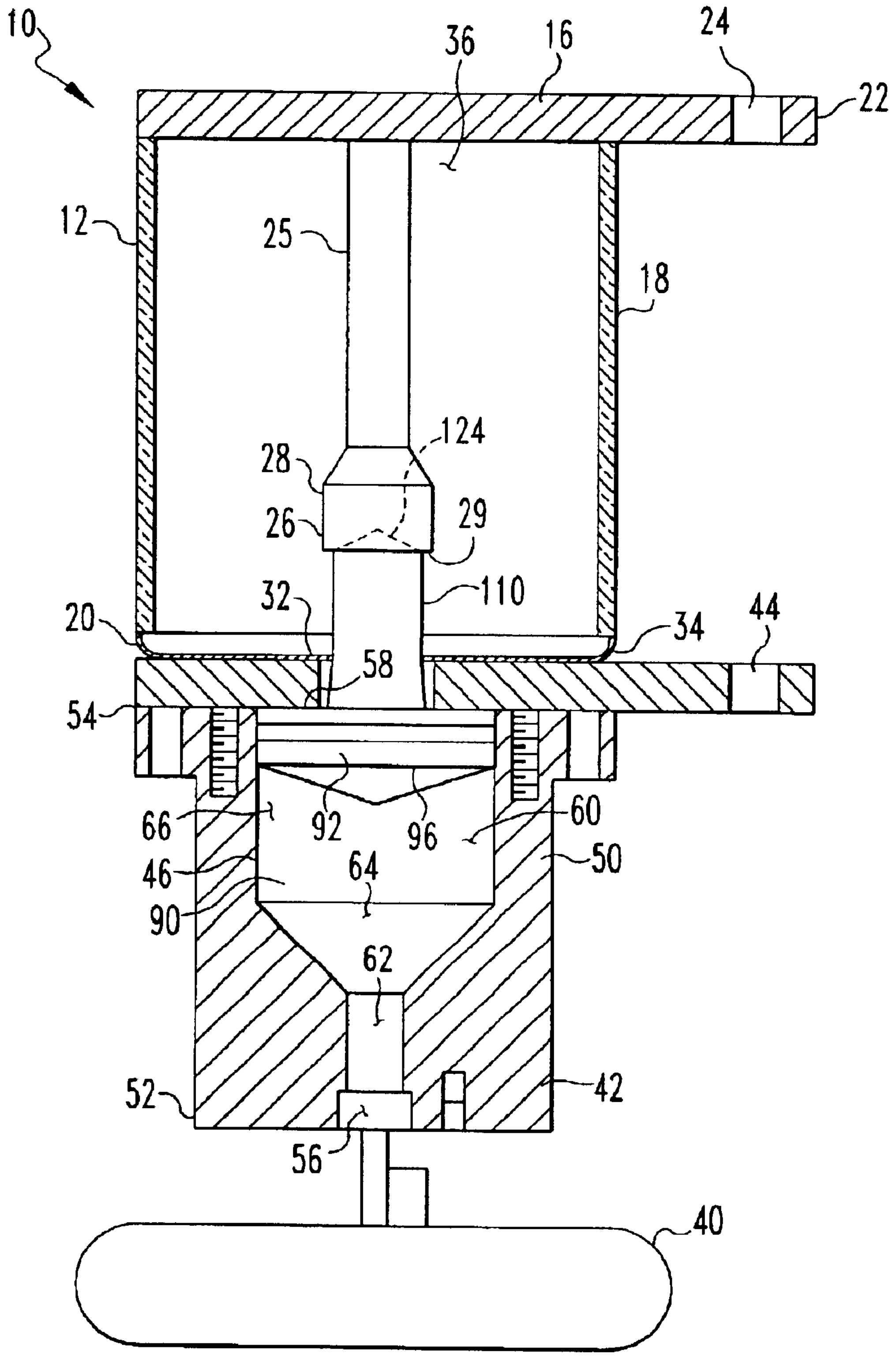
FIG. 3 is a cross-sectional view of the present invention with the piston in the second position.

As shown in FIGS. 1–3, a vacuum arc interrupter 10 includes a vacuum chamber assembly 12 and a pressure chamber assembly 14. The vacuum chamber assembly 12 includes a first conductor 16, a non-conductive housing 18, and a seal cup 20. The first conductor 16 is made from a conductive material and, preferably, is shaped as a circular disk. The first conductor 16 may include a radial extension 22 having an attachment opening 24 therethrough. The attachment opening 24 is structured to allow a power line to be coupled to the first conductor 16. The first conductor 16 also includes an electrode 23 having a stem 25 and a receiving cup 26. The cup 26 is disposed at the distal end of the stem 25 and extends into the vacuum chamber 36 described hereinafter. The cup 26 is made from a conductive material and includes a continuous sidewall 28 having an open end 29, thereby defining a cavity 30. The cup 26 is supported by the stem 25 so that the cup 26 is spaced from the first conductor 16. The open end 29 has a cross-sectional area that is smaller than the widest portion of the lance tip 118, described hereinafter. To reduce the magnitude of the electric field on the cup 26, the cup 26 may have a cross-sectional area greater than is mechanically required. The stem 25 may have the same cross-sectional area, or be smaller than, the cup 26.

The non-conductive housing 18 is made from a non-conductive material, preferably a ceramic. The non-conductive housing 18 has a shape that corresponds to the shape of the first conductor 16. Thus, when the first conductor 16 has a disk shape, the non-conductive housing 18 is a hollow cylinder. One axial end of the non-conductive housing 18 is sealingly coupled to the first conductor 16.

The seal cup 20 includes a generally planar base member 32 and a sidewall 34 generally perpendicular thereto. The seal cup 20 is made from a rigid, non-brittle material such as a cupro-nickel alloy. The alloy material preferably has between about 50 to 95% copper, and more preferably about 70% copper, and between about 5 to 50% nickel, and more preferably about 30% nickel. The alloy may also have lesser amounts of other elements or impurities. Generally, the seal cup 20 material may be torn without a substantial amount of fragmentation. The seal cup sidewall 34 is sealingly coupled to the axial end of the non-conductive housing 18 opposite the first conductor 16. Thus, the combination of the first conductor 16, the non-conductive housing 18, and the seal cup 20 define a vacuum chamber 36. As will described hereinafter, the seal cup 20 contacts the second conductor 70. To prevent an arc from forming within the vacuum chamber 36, the first conductor 16, or the electrode 23 if present, and the seal cup 20 are separated by a distance sufficient to lower the magnitude of the electric field to below that which would lead to an electrical breakdown within the vacuum. This distance is, generally, about 0.4 inch to 2.0 inches and varies depending upon the voltage in the system. For example, for a voltage of about 125 kilovolts, the distance is preferably about 0.6 inch.

To reduce the magnetic field at the point where the seal cup 20 is attached to the non-conductive housing 18, a ring shaped metal may extend into the vacuum chamber 36 from the seal cup 20. The shield extends adjacent to the seal cup side wall 34 and has a height sufficient so that the shield is disposed between the point where the seal cup 20 is attached to the non-conductive housing 18 and the electrode 23. Additionally, there may be an upper seal cup, similar to the seal cup 20 described in detail above, disposed between the first conductor 16 and the ceramic housing 18. The upper seal cup includes an opening to allow the stem 25 to pass therethrough.

The pressure chamber assembly 14 includes a gas generation device 40, a pressure chamber body 42, a second conductor 70, and a bullet assembly 46. The gas generation device 40 may be any gas generation device such as those manufactured by TRW Airbag Systems GmbH & Co. KG, Wernher-Von-Braun-STR. 1, D-84544 Asehan am Inn, Germany.

The pressure chamber body 42 is preferably cylindrical and includes a barrel 50 and a mounting flange 51. The barrel 50 has a first end 52 and a second end 54. The barrel 50 has an inlet port opening 56 on the first end 52 and a bullet assembly opening 58 at the second end 54. The inlet port opening 56 is smaller than the bullet assembly opening 58. The inlet port opening 56 is in fluid communication with the bullet assembly opening 58. Thus, the barrel 50 defines a pressure chamber 60. The pressure chamber 60 includes a first sized portion 62, a transition portion 64, and a second sized portion 66. The first sized portion 62 has a smaller cross-sectional area than the second sized portion 66. The first sized portion 62 is in fluid communication with the inlet port opening 56. The second sized portion 66 is in fluid communication with the bullet assembly opening 58. The transition portion 64 is disposed between, and in fluid communication with, the first sized portion 62 and the second sized portion 66. The transition portion 64 has a cross-sectional area that tapers from the cross-sectional area of the first sized portion 62 to the cross-sectional area of the second sized portion 66. The pressure chamber 60 preferably has a generally circular cross-sectional area. The flange 51 extends radially from the barrel second end 54 and includes a plurality of fastener openings 53.

The second conductor 70 is made from a conductive material and, preferably, is shaped as a circular disk. The second conductor 70 may include a radial extension 72 having an attachment opening 74 therethrough. The attachment opening 74 is structured to allow a ground line to be coupled to the second conductor 70. The second conductor 70 has a first side 76 and a second side 78. The second conductor 70 also includes a tapered passage 80, preferably medially disposed on the disk. The tapered passage 80 has a first sized opening 82 on the second conductor first side 76 and a second sized opening 84 on the second conductor second side 78. The first sized opening 82 is larger than the second sized opening 84. Thus, the tapered passage 80 has a tapered sidewall 86 extending between the openings 82, 84. The tapered passage 80 is tapered at an angle θ corresponding to the angle of the flare of the lance base portion 120, described below. As described hereinafter, typically a power line is coupled to the first conductor 16 and a ground line is connected to the second conductor 70.

The bullet assembly 46 includes a piston assembly 90 and a lance 110. The piston assembly 90 includes a piston body 92, and may include a piston ring 94. The piston body 92 is a solid body which is generally planar having a first side 96, a second side 98, and a sidewall 100. The piston body 92 has the same general cross-sectional shape and size as the pressure chamber second portion 66 and is structured to be slidably disposed therein. The sidewall 100 includes a groove 101 wherein the piston ring 94 may be seated. The piston first side 96 is not flat having either a concave surface, see FIG. 4D, or, preferably, a convex surface, See FIGS.

1–3. Where the piston body 92 is a disk, i.e., when the pressure chamber 60 is circular, the first side 96 is conical having an angle, ϕ, between about 30 to 90 degrees, and preferably about 80 degrees as measured from a line passing through the axis of the piston body 92. The first side 96, preferably, has a more obtuse angle than the angle of the taper of the pressure chamber transition portion 64. As is described hereinafter, the piston body first side 96 is exposed to the pressure created by the gas-generating device 40 and may be referred to as the "pressure surface." The piston body second side 98 is generally flat and includes an attachment device 102, for example, a threaded opening 103.

Figure 4A:
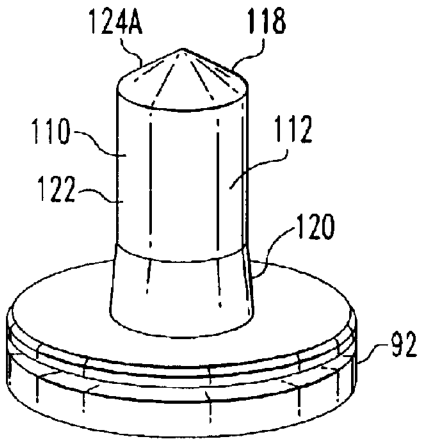
FIG. 4A is an isometric view of the bullet assembly wherein the lance has a circular medial portion and a conical tip.
Figure 4B:
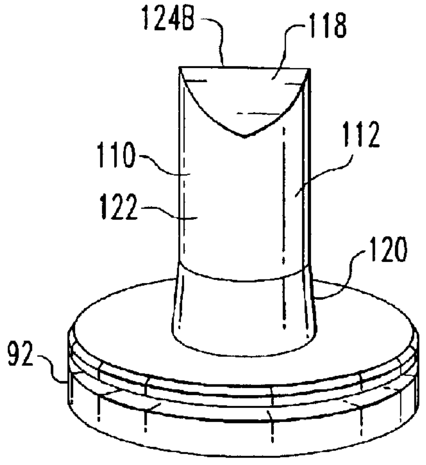
FIG. 4B is an isometric view of the bullet assembly wherein the lance has a circular medial portion and a knife edge tip.
Figure 4C:
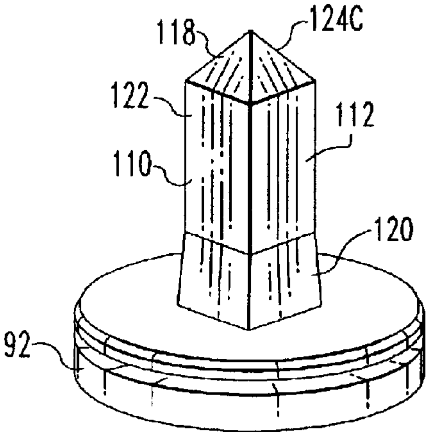
FIG. 4C is an isometric view of the bullet assembly wherein the lance has a square medial portion and a pyramidal tip.
Figure 4E:
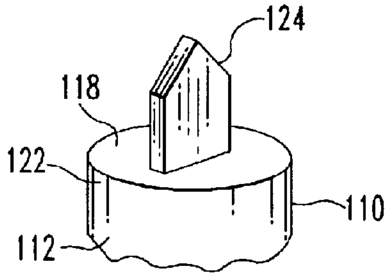
FIG. 4E is an isometric view of the bullet assembly wherein the lance has a circular medial portion and a blade tip.
Figure 4D:
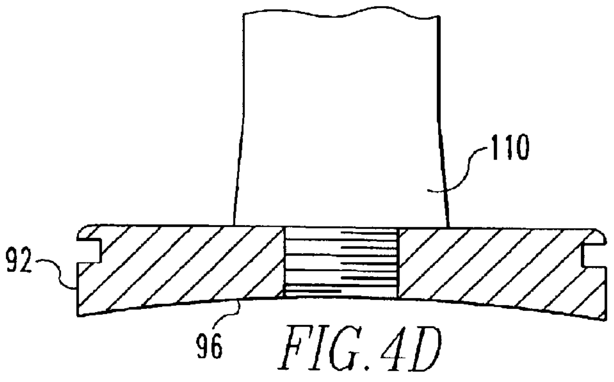
FIG. 4D is a cross-sectional view of a piston body having a concave first side.

The lance 110 includes an elongated body 112 having a first end 114 and a second end 116. The lance body 112 includes a tip 118 disposed at the first end 114 and a base 120 disposed at the second end 116. Between the tip 118 and the base 120 is a medial portion 122. The tip 118 tapers to an edge or a point. The end of the tip 118 acts as a blade portion 124 to assist in cutting the seal cup 20 as described below. The angle of the tip taper, α, is between about 90 and 150 degrees and preferably about 120 degrees as measured from a line parallel to the outer surface of the surface of the medial portion 122. The medial portion 122 preferably has a constant cross-sectional area. The medial portion 122 preferably has a circular or square cross-section. As shown in FIG. 4A, when the medial portion 122 is circular, the tip 118 and the blade portion 124 are, preferably, conical. However, as shown in FIG. 4B, the medial portion 122 may be circular and the tip 118 and blade portion 124 may be a knife edge 124B. As shown in FIG. 4C, when the medial portion 122 is square, the tip 118 and blade portion 124C are pyramidal. Alternatively, as shown in FIG. 4E, the medial portion 122 may be circular and have a tapered blade 124D. The base portion 120 is flared relative to the medial portion 122. The base portion 120 flare is at an angle, θ, between about 90 and 150 degrees, or, preferably about 94 degrees as measured from a plane passing radially through the lance medial portion 122. The lance second end 116 includes an attachment device 125, for example, a threaded rod 126 structured to engage the piston attachment device 102.

The bullet assembly 46 is formed when the lance 110 is coupled to the piston assembly 90 by coupling the lance attachment device 125 to the piston attachment device 102. Thus, the lance 110 extends from the piston second side 98. The lance 110 has a length sufficient to span the gap between the second conductor 70 and the cup 26. The lance 110 is, however, sized so that the flared base 120 contacts the second contact tapered opening as the tip 118 contacts the cup 26.

The pressure chamber assembly 14 is formed by inserting the bullet assembly 46 into the chamber second size portion 66 with the lance 110 extending toward the bullet assembly opening 58. The bullet assembly 46 is disposed in a first position where the piston body 92 is in the pressure chamber second sized portion 66 and adjacent to the chamber transition portion 64, with the lance 110 extending into the second sized portion 66. The lance 110 does not, however, extend beyond the bullet assembly opening 58. Because the piston body first side 96 has a taper angle that is more obtuse that the taper angle of the pressure chamber transition portion 64, a gap exists between the piston body first side 96 and the pressure chamber transition portion 64. The piston ring 94 engages the sidewall of the chamber second sized portion 66. The second conductor 70 is coupled to the pressure chamber mounting flange 51 by fastener 53 with the second conductor first side 76 disposed toward the pressure chamber 60. Thus, the larger, first sized opening 82 of the tapered passage 80 is adjacent to the bullet assembly 46. The gas generation device is coupled to, and in fluid communication with, the inlet port opening 56.

In this configuration, the bullet assembly 46 is structured to move from the first position, described hereinbefore, to a second position, shown in FIG. 3, where the piston body 92 is moved adjacent to the second conductor 70. In the second position, the flared base 120 of the lance 110 engages the second conductor tapered passage 80, and the lance 110 extends beyond the second conductor 70.

Accordingly, to assemble the vacuum arc interrupter 10, the vacuum assembly 12 is coupled to the pressure chamber assembly 14 with the seal cup 20 contacting, and in electric communication with, the second conductor 70. In this configuration, translation of the bullet assembly 46 from the first position to the second position will result in the lance blade portion 124 piercing the seal cup 20 and the lance 110 contacting the first conductor cup 26. As stated hereinbefore, the lance 110 is sized such that the tip 118 engages the cup 26 at the same time the flared base 120 engages the second contact tapered passage 80. Thus, when the bullet assembly 46 is in the second position, the first and second conductors 16, 70 are in electrical communication.

In operation, the bullet assembly 46 is moved from the first position to the second position by the gas-generating device 40. That is, the gas generating device 40 delivers gas at a pressure between about 180 and 375 psi, and preferably about 180 psi, through the inlet port opening 56 in to the chamber first size portion 62. This increase of pressure occurs in about 0.50 msec and causes the bullet assembly 46 to move from the first position to the second position in less than 2.0 msec. Because the inlet port opening 56 is on the piston first side 96, gas from the gas generating device will flow into the chamber first sized portion 62 and transition portion 64 and contact the angled piston first side 96. The angle of the piston first side 96 assists the gas in dispersing through the chamber transition portion 64 and thus creates a more even pressure distribution on the piston first side 96. As the bullet assembly 46 moves from the first position to the second position, the lance tip 118 and medial portion 122 pass through the tapered passage 80 causing the blade portion 124 to puncture the seal cup planar member 32. Because the seal cup 20 is made of a cupro-nickel material, the seal cup 20 is torn as opposed to fragmenting.

As stated hereinbefore, the lance tip 118 engages the cup 26. If the lance tip 118 is conical, the taper of the tip 118 and the taper of the cup 26 sidewall is, preferably, similar. Thus, the lance 110 and the cup 26 cooperatively engage each other. If, however, the lance tip 118 is pyramidal, the lance 110 and cup 26 will engage in a mechanical connection as the square lance 110 collides with the circular cup 26. This collision will form a mechanical connection that may be enhanced if an arc forms between the lance 110 and the cup 26 thereby partially melting either the lance 110 or the cup 26. Additionally, after the downstream arc is interrupted and electricity is flowing through the vacuum arc interrupter 10, heat generated in the flared base 120 and the second contact tapered passage 80 will partially melt the metal components and form a weld. As such, the bullet assembly 46 is mechanically locked by a weld to the second conductor 70.

As shown in FIG. 1, to prevent arcing in a LV or MV device 1, the vacuum arc interrupter 10 must be electrically coupled to the circuit, between the power source 2 and the LV or MV device 1 by a power line 3. Typically, the power line 3 connected to the circuit is coupled to the first conductor 16 and a ground line 4 is connected to the second conductor 70. An arc detection device 5, which may be any common arc detector or a device such as the one described in co-pending application Ser. No. 10/171,826, incorporated by reference, is used to detect an arc within the LV or MV device 1 and to activate the gas generation device 40. Thus, when an arc in the LV or MV device 1 is detected, the vacuum arc interrupter 10 is activated thereby grounding the circuit upstream of the LV or MV 1 device and interrupting the arc. The circuit with the bolted fault created by the vacuum arc interrupter 10 is broken by a circuit breaker (not shown) upstream of the vacuum arc interrupter 10.

Figure 5:
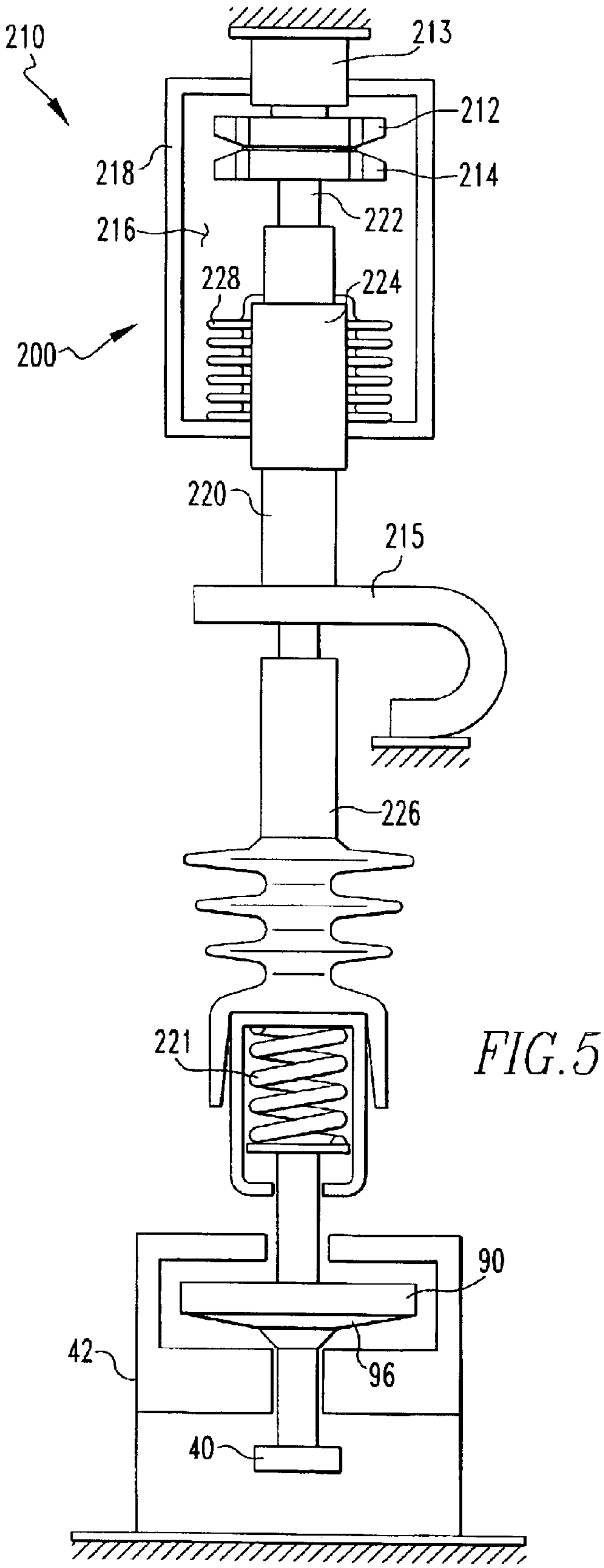
FIG. 5 is a schematic view of a vacuum arc interrupter utilizing the piston of the present invention.

Aspects of this invention may also be used in conjunction with an alternate embodiment of the vacuum arc interrupter 210 having two contacts in a vacuum chamber assembly 200. That is, as shown in FIG. 5, a second embodiment of the vacuum arc interrupter 210 includes the vacuum chamber assembly 200 having two contacts 212, 214 disposed in a vacuum chamber 216, as well as a first bus 213 and a second bus 215. The vacuum chamber 216 includes a non-conductive housing 218. A first contact 212 is fixed, and the other, second contact 214 is movable. The fixed contact 212 is sealingly coupled to the non-conductive housing 218 and is in electrical communication with a first bus 213 that is external to the vacuum chamber 216. The movable contact 214 is coupled to a rod 220 having a first end 222, a medial portion 224 and a second end 226. The movable contact 214 is disposed at the rod first end 222. A bellows 228 is coupled to the rod medial portion 224 and to the non-conductive housing 218. The rod 220 is structured to move between a first position wherein the contacts are spaced from each other, to a second position wherein the contacts contact each other. A second bus 215 is coupled to the rod 220 and is in electrical communication with the second contact 214. The vacuum arc interrupter 210 further includes a pressure chamber assembly 14. The pressure chamber assembly 14 is substantially similar to the pressure chamber assembly 14 described hereinabove. The second end of the rod 220 is coupled to a piston assembly 90 disposed in a pressure chamber assembly 14. The piston assembly 90 is substantially similar to the piston assembly 90 described hereinabove. That is, a piston assembly 90 has a concave or convex first, pressure surface 96, that is exposed to the gas created by a gas generation device 40. In this embodiment of the vacuum arc interrupter 210, however, the piston assembly 90 is coupled to the rod 220. As such, when the gas generation device 40 is activated, the piston assembly 90 moves the rod 220 between the first position and the second position, thereby moving the contacts 212, 214 from the open position to the closed position. The closing of the contacts 212, 214 occurs in less than 2.0 msec. Typically the first bus 213 is coupled to, and in electrical communication with, the circuit having the MV or LV device and the second bus 215 is in electrical communication with a ground. Additionally, the rod 220 may include one or more impact absorbing devices 221, such as springs or shock absorbers, disposed between the piston assembly 90 and the second movable contact 214.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A vacuum arc interrupter comprising:

a vacuum chamber assembly having a vacuum chamber and a first conductor structured to be coupled to a circuit;

said first conductor disposed within said vacuum chamber;

a pressure chamber assembly having a second conductor structured to be coupled to a ground, a pressure chamber, a gas generation device and a bullet assembly;

said pressure chamber assembly disposed adjacent to said vacuum chamber assembly;

said gas generation device coupled to, and in fluid communication with said pressure chamber; and said bullet assembly disposed in said pressure chamber and structured to move between a first position, where said bullet assembly is spaced from said first and second conductors, and a second position, where said bullet assembly contacts, and is in electrical communication with, said first and second conductors.

2. The vacuum arc interrupter of claim 1 wherein:

said bullet assembly includes a lance and a piston assembly having a body with a first side and a second side;

said lance coupled to said piston assembly;

said lance made from a conductive material having an elongated body with a first end and a second end; and said lance first end tapered to a point.

3. The vacuum arc interrupter of claim 2 wherein:

said lance body includes a tip, a medial portion, and a base;

said tip disposed at said lance first end, said base disposed at said lance second end, and said medial portion disposed therebetween; and said tip having a taper angle between about 90 and 150 degrees.

4. The vacuum arc interrupter of claim 3, wherein said tip has a taper angle of about 120 degrees.

5. The vacuum arc interrupter of claim 2, wherein:

said base is flared, having a smaller cross-sectional area adjacent to said medial portion and a greater cross-sectional area adjacent to said disk;

said base flare angle being between about 90 and 150 degrees.

6. The vacuum arc interrupter of claim 5, wherein said base flare angle is about 94 degrees.

7. The vacuum arc interrupter of claim 6, wherein:

said second conductor has a tapered passage;

said bullet assembly lance flared base is structured to engage said tapered passage; and wherein, when said bullet assembly is in said second position, said lance base engages said tapered passage.

8. The vacuum arc interrupter of claim 7, wherein:

said vacuum chamber assembly includes a non-conductive housing and a seal cup;

said first conduct and said seal cup each sealingly coupled to said non-conductive housing, thereby defining said vacuum chamber;

said lance tip is structured to puncture said seal cup as said bullet assembly moves from said first position to said second position.

9. The vacuum arc interrupter of claim 8, wherein said first conductor and said seal cup are separated by a distance of at least 0.4 inches, but no more than about 2.0 inches.

10. The vacuum arc interrupter of claim 8 wherein:

said first conductor includes an electrode having a stem and a receiving cup; and said cup structured to engage said lance.

11. The vacuum arc interrupter of claim 10, wherein said electrode and said seal cup are separated by a distance of at least 0.4 inches, but no more than about 2.0 inches.

12. The vacuum arc interrupter of claim 2, wherein said piston body first side has a convex surface.

13. The vacuum arc interrupter of claim 12, wherein said piston body first side is conical.

14. The vacuum arc interrupter of claim 13, wherein said piston body conical first side has an angle between about 30 and 90 degrees.

15. The vacuum arc interrupter of claim 14, wherein said piston body conical first side has an angle of about 80 degrees.

16. The vacuum arc interrupter of claim 14, wherein:

said pressure chamber assembly has a cylindrical barrel defining said pressure chamber;

said barrel has a first end and a second end, and said pressure chamber has a tapered transition portion and a second sized portion;

said transition portion in fluid communication with said second sized portion;

said barrel first end having an inlet opening;

said inlet opening in fluid communication with said transition portion;

said barrel second end having a bullet assembly opening;

said bullet assembly opening in fluid communication with said second sized portion;

a bullet assembly disposed in said pressure chamber second sized portion;

said gas generation device coupled to said inlet port; and wherein, upon generation of a gas by said gas generation device, said bullet assembly moves within said pressure chamber from said first position to said second position.

17. The vacuum arc interrupter of claim 16, wherein said piston body first side taper angle is more obtuse than the taper angle of said transition portion whereby a gap exist between said piston body first side and said transition portion when said bullet assembly is in said first position.

18. The vacuum arc interrupter of claim 16, wherein said gas generation device is structured to move said bullet assembly between said first position and said second position in less than 2.0 msec.

19. The vacuum arc interrupter of claim 15 wherein:

said lance body includes a tip, a medial portion, and a base;

said tip disposed at said lance first end, said base disposed at said lance second end, and said medial portion disposed therebetween; and said tip having a taper angle between about 90 and 150 degrees.

20. The vacuum arc interrupter of claim 19, wherein said tip has a taper angle of about 120 degrees.

21. The vacuum arc interrupter of claim 19, wherein:

said base is flared, having a smaller cross-sectional area adjacent to said medial portion and a greater cross-sectional area adjacent to said disk;

said base flare angle being between about 90 and 150 degrees.

22. The vacuum arc interrupter of claim 21, wherein said base flare angle is about 94 degrees.

23. The vacuum arc interrupter of claim 22, wherein:

said second contact has a tapered passage;

said bullet assembly lance flared base is structured to engage said tapered passage; and wherein, when said bullet assembly is in said second position, said lance base engages said tapered passage.

* * * * *